United States Patent
Gonsalves et al.

(10) Patent No.: US 8,928,479 B2
(45) Date of Patent: Jan. 6, 2015

(54) SECURITY SYSTEM WITH AUTOMATIC ALARM

(76) Inventors: Troy Gonsalves, Waterloo (CA); Geoffrey Vanderkooy, Waterloo (CA); Philip Thomas, Waterloo (CA); Robert Young, Kitchener (CA)

( * ) Notice: Subject to any disclaimer, the term of this patent is extended or adjusted under 35 U.S.C. 154(b) by 388 days.

(21) Appl. No.: 13/041,458

(22) Filed: Mar. 7, 2011

(65) Prior Publication Data

US 2013/0093587 A1    Apr. 18, 2013

Related U.S. Application Data

(60) Provisional application No. 61/311,351, filed on Mar. 7, 2010.

(51) Int. Cl.
| | |
|---|---|
| G08B 1/08 | (2006.01) |
| G08B 21/02 | (2006.01) |
| G06F 11/07 | (2006.01) |
| G08B 21/04 | (2006.01) |

(52) U.S. Cl.
CPC ............ *G08B 21/02* (2013.01); *G06F 11/0757* (2013.01); *G08B 21/0415* (2013.01)
USPC ......................... 340/539.11; 713/323; 714/55

(58) Field of Classification Search
CPC ............ G06F 11/0757; G06F 11/0793; G06F 11/0751
USPC ......... 340/539.11; 709/206; 713/323; 714/55
See application file for complete search history.

(56) References Cited

U.S. PATENT DOCUMENTS

| | | | | |
|---|---|---|---|---|
| 5,175,845 A | * | 12/1992 | Little | 713/323 |
| 2008/0263165 A1 | * | 10/2008 | Hui et al. | 709/206 |
| 2012/0154155 A1 | * | 6/2012 | Brasch | 340/573.4 |

* cited by examiner

*Primary Examiner* — John A Tweel, Jr.

(57) ABSTRACT

An automatic alarm system is described that is triggered by the lack of event at one or more portable remote unit(s). The system includes an electromagnetic interface from a plurality of portable units to a central command and monitoring element. This automatic triggering of an alarm condition adds security to the users of the system since it is not always feasible to explicitly trigger an alarm when in danger.

17 Claims, 2 Drawing Sheets

020
SECURITY SYSTEM WITH AUTOMATIC ALARM

CROSS REFERENCE TO RELATED APPLICATION

PPA 61/311,351

BACKGROUND OF THE INVENTION

The present invention is in the technical field of security systems to protect individuals, or groups of individuals. More particularly, the present invention is in the technical area of alarm systems utilizing portable remote units with RF or other electromagnetic connectivity to a central control and monitoring element.

A number of prior art devices have been proposed for security systems with remote activation. Generally they involve some form of "panic button" that the user activates when they believe they need assistance. The problem with this type of system is that it relies on the user being able to activate the panic button. In the event that the user is incapable of action because the potential problem has actually occurred (accident causing unconsciousness, robbery, abduction, etc.) then the system does not raise the alarm as desired.

Uchida et al. (U.S. Pat. No. 6,696,956) is the only system we are aware of that checks on the user until "vital reaction" is not seen, allowing some level of automation. This is an improvement over the prior art we have uncovered, but really only allows for a sensible action when death is the alternative of concern. As long as there is some "vital reaction" (i.e. life) then the system will not call for help. It does not allow for the amount of time that the system waits to be set by the user, nor is it tuned to the lifestyle, actions or environment of the user.

SUMMARY OF THE INVENTION

This invention provides automatic alarm signals based on the lack of an event occurring at a portable remote unit thereby facilitating alarm generation without an individual performing any explicit action.

The system consists of a central control and monitoring element able to communicate with one or more portable remote unit(s), by direct or networked radio or other electromagnetic interfaces. The individual carrying the portable remote unit is able to "arm" it when in a situation of perceived or real threat. Alternatively, the portable remote unit may be armed by policy established at the central control and monitoring element. This arming of the portable unit establishes a watchdog mechanism, or watchdog, that expires based on time interval, location, physiological, or other parameter(s). If the watchdog process is not reset back to the full time interval or disabled by some explicit action of the individual or system, it will enable a process that will cause an alarm at the central monitor and control element. This alarm is processed by the monitoring system and appropriate action is taken.

DETAILED DESCRIPTION OF THE INVENTION

Figure 1:
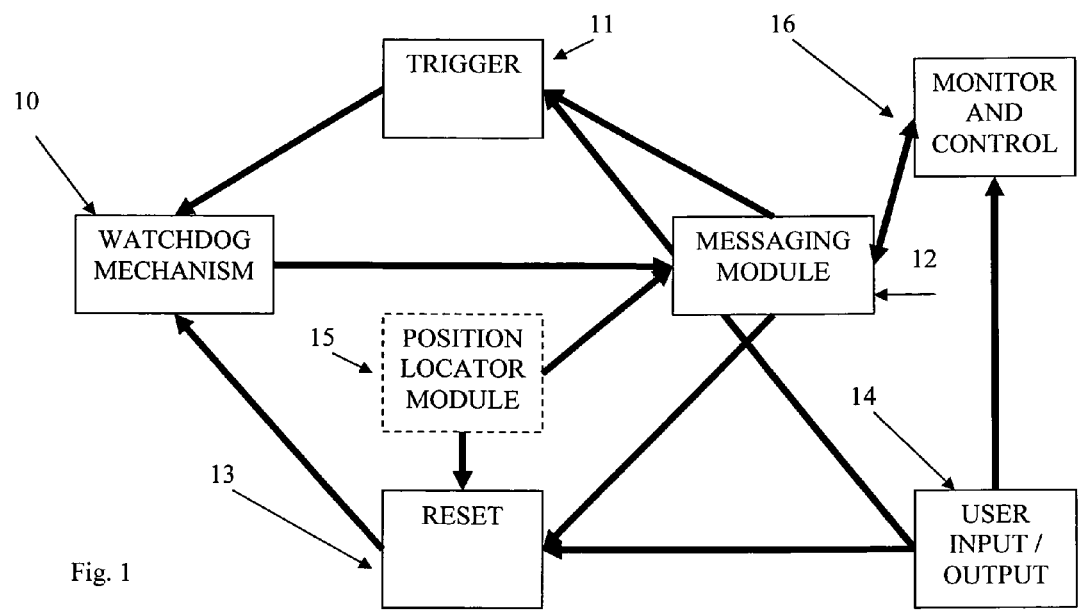
FIG. 1 is a block diagram of the invention describing its essential and optional elements

Referring now to FIG. 1 there is shown the essential and optional elements of the security system. The core of the system is a watchdog mechanism 10 that, once started by a trigger 11 will generate an indication to a messaging module 12 unless interrupted by a reset module 13. The trigger 11 is also used to disable the watchdog mechanism if desired. Control of the trigger is done either by user input 14 or, optionally, a central monitor and control element 16 through a messaging module 12. An optional position locator module 15 may report location information with the indication from the watchdog mechanism 10 to the messaging module 12.

Considering the elements in further detail, the watchdog mechanism 10 would typically, but not exclusively, be a timer that begins to count down when triggered and can be reset to its initial value at any time by the reset 13. Alternatively, the watchdog mechanism could be a function of distance from a prescribed location or physical path, just as a typical timer indicates the distance in time from a specific trigger point. If the watchdog mechanism expires it will send a physical or logical indication to a messaging module that the watchdog has expired and some system action is required. Optionally, the watchdog mechanism can send a warning indication before its expiration that can alert the user or system that unless a reset is generated the expiration indication will occur. This function can be used to reduce false alarms. The reset may have to meet certain conditions to be valid, allowing for the user to be the only one able to generate the reset. In addition, the system could have a 'heartbeat' signal with a monitoring station. The loss of communication as evidenced by loss of the heartbeat signal could automatically trigger the watchdog.

The trigger 11 is used to both initiate the watchdog mechanism and disable the mechanism. There can be more than one trigger 11. Triggers 11 could have only the specific function of initiation or disabling, as suits the application. The initiation is based directly on user input 14 or a system decision at the monitor and control system 16 depending on the application. Similarly, disabling the watchdog mechanism can be based on input from the user or system although there are some applications where user disabling would not be allowed to avoid having adversarial actors defeat the alarm system.

The messaging module 12 provides information exchange between the watchdog mechanism and the user and/or system. It is also requests and merges information from the optional position locator module 15 which can be a Global Positioning System (GPS) unit or similar technology. The reset 13 can take input from the user 14 or the system 16, either directly or through the messaging module 12.

The user interface 14 would typically be implemented as a physical interface not limited to dedicated push buttons, programmable buttons, motion detectors, physiological, and sound detection and generation devices, or display indications.

The monitor and control element 16 is of particular utility when there are multiple users and/or there is great danger of adversarial intervention where the physical disabling or destruction of other elements of the system is probable or possible.

In broad embodiment, the present invention has utility across many applications. Automatic alarming is of value for those individuals that are, or perceive to be, at high risk. Several applications will be described below to illustrate typical embodiments. Note that the utility of this patent is not limited to these illustrative examples. Typical scenarios would be vulnerable persons (e.g. women, children, infirm, disabled, etc.) in isolated situations (parking garage, cross campus travel, etc.) or in an unprotected environment or high value persons traveling corporately. The invention could be offered as a commercial service for operations such as parks workers that are in isolated situations or fleets servicing remote locations like tow truck operations. The central control and monitoring element can be operated by a third party security firm to provide value added service to the users and reduce false alarms to public safety organizations. It could be used to improve the safety of armored car personnel while they are out of the vehicle moving valuables.

Figure 2:
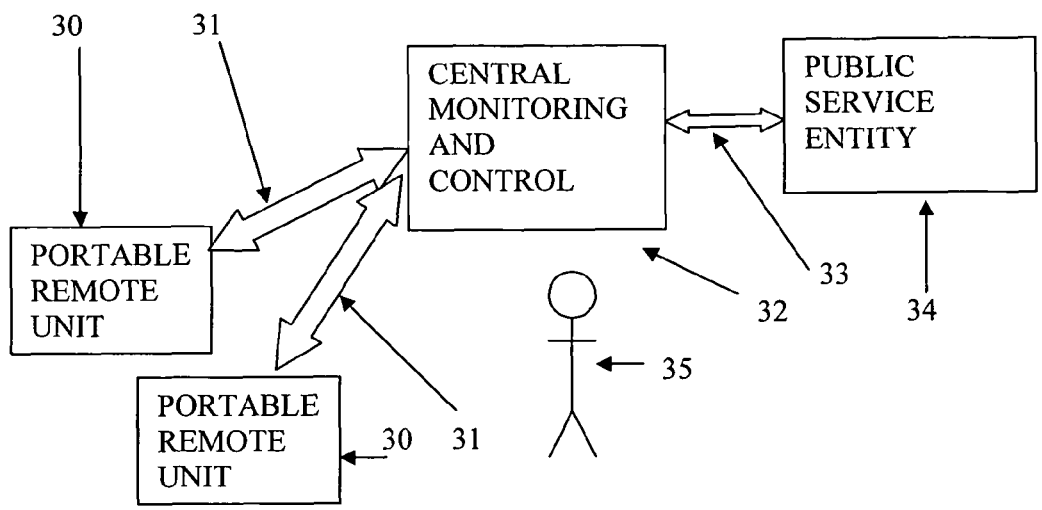
FIG. 2 is a block diagram of an embodiment of the invention in an application that protects multiple users in a wide area environment.

FIG. 2 describes a typical embodiment of the invention in an application where there are one or more users to be protected anywhere across a wide area physically. The system consists of a central monitoring and control element 32 connected by RF messaging 31 to a plurality of portable remote units 30. The central monitoring element may have an operator 35 that makes decisions on actions to be taken including sending a message 33 to a public security entity 34 for further action. A typical public service entity would be police or North American 911 services. In addition, private security firms could be alerted, or the user contacted. In this implementation, the following elements of FIG. 1 would reside in the portable remote unit: watchdog mechanism 10, trigger 11, messaging module 12, reset module 13 and the user interface 14. The position locator module 15 would typically be housed in the remote unit using a common technology such as GPS. The central monitoring element would house the central monitor and control 16 function. The partitioning of the system into physical elements could be modified to limit the functional elements in the portable remote unit 30 to the reset 13, messaging module 12, and user interface 14 if destruction of the portable unit is probable due to the application.

A typical embodiment of the portable remote unit 30 is a software application running on a smart cellular telephone such as the Apple iPhone or the RIM BlackBerry. These devices have the messaging, position location technology (typically GPS), and user interface to enable this invention. Alternate implementations would be stand alone portable remote units with an RF interface or implementation on portable computing platforms such as PDA's or laptop computers, or GPS guidance systems or car help systems (such as General Motors' OnStar® system) that may be carried/used by at risk individuals. Network based services could also use this technology as described in FIG. 2 where the trigger 11 and reset 13 are provided through the messaging module 14 from the central monitoring and control element.

The user interface 14 may be via one or more keys on the portable device. Alternative input methods include but are not limited to voice recognition, unit movement (iPhone—e.g. shake, invert, etc.) and touch screens. In FIG. 2 the RF messaging 31 is a cellular system in this embodiment. However, many other RF systems can enable this invention including any combination of satellite, WiFi, WiMax, PMR, and special purpose radio.

The key parameters of the portable remote unit operation are a function of the application. The interval between trigger and reset is variable and, in any event, sufficiently short to provide protection and sufficiently long to minimize irritation of the user. Typical values would be 2 minutes to 20 minutes. Feedback to the user when the reset is imminent may be provided to allow the user to reset the timer if warranted. Of course if the user does not take action because of incapacitation or danger the reset will not be sent. The trigger may be set by the user or the system when a user is in perceived danger. For location based threat conditions the position location module 12 could send location information through the messaging module 14 to the central monitoring and control element to identify a trigger condition if the portable remote unit is located in a pre-defined danger zone.

Figure 3:
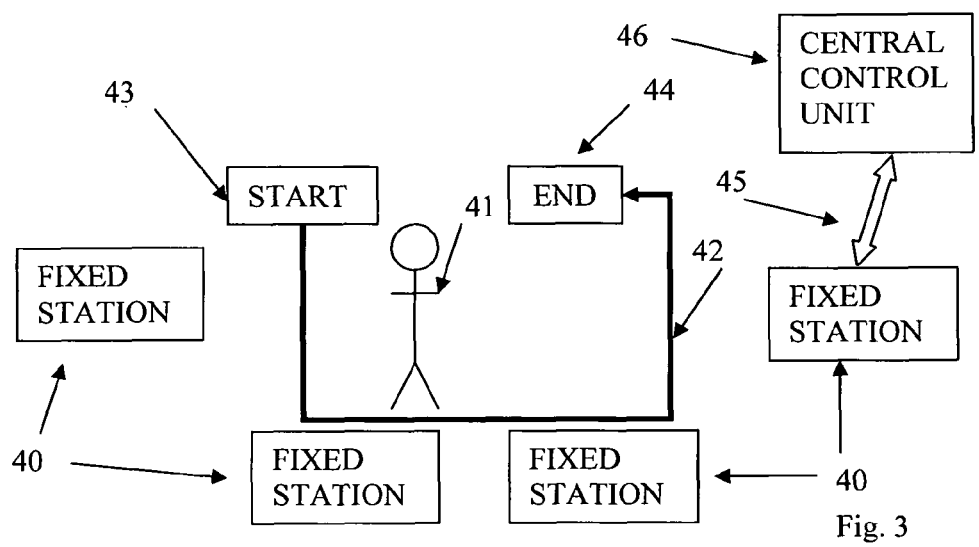
FIG. 3 is a block diagram of an embodiment of the invention in an armored car application.

FIG. 3 describes a typical embodiment for the purpose of security guard tracking. The scenario is one where there is a prescribed route for the guard on duty. Deviation from that route or reasonable timing would provide an alarm condition because it could indicate that the guard encountered trouble or that the guard has gone to an unauthorized area. A significant difference in implementation from the previous example is that the watchdog timers are distributed in a plurality of fixed stations 40. Each station 40 is connected by a signaling path 45 to a central control station 46 where the monitoring and control 16 function is implemented (note not all signaling paths are shown to enhance clarity in the figure). In FIG. 3 the guard 41 is assigned a route 42 with a start 43 and end 44 location. Note that 43 and 44 can be the same. The timing of the route is known to the system and specific watchdog intervals are programmed into each fixed station 40. The guard carries a portable unit that provides a reset 13 to each watchdog timer when sufficiently proximate. Alternatively the guard could reset the watchdog manually although the likelihood of error would be increased in that case. If the guard fails to pass by and reset the fixed station an alert is sent to the control station for alarm processing.

The embodiment of FIG. 3 makes use of situational awareness. Knowledge of the sequence of predetermined actions informal behavior allows the alarm system to have better responsiveness to situations resulting in lower false positives and false negatives than an unaware implementation.

The invention is applicable to a multitude of other applications. Several examples are described in the following paragraphs.

A typical application is security for an employee doing a bank drop. During the delivery (s)he may feel uneasy and desire automated monitoring in case (s)he is intercepted. The user could regularly be tapping a phone in her/his pocket. The device could ring as if receiving a phone call, or vibrate to warn the user about the imminent expiry of the watchdog if a tapping interval is exceeded. Answering the phone by pressing a specific key could also reset the watchdog. Answering with any other key or not answering could confirm a problem. This allows someone being forced to reset the watchdog to execute a false reset thereby finalizing the expiration of the watchdog.

A further application is protection of an individual passing through an area perceived to be unsafe such as a park late at night or a rough district of a city. Upon entering the area or situation the user would enable the watchdog and throughout her/his journey (s)he would regularly reset the watchdog by entering a code on a phone for example. Not entering the code, say when stopped by a stranger, would trigger the alarm (e.g. call the authorities) with current GPS location. Entering the wrong code could in fact silently trigger the alarm as well, again allowing the person not to be forced to reset the watchdog if the possibility were known. The device could also start sending audio and video once the watchdog expires to help the receiving agencies to have knowledge of the situation.

A further application is protection of a health care worker visiting patients that have a potential to be violent or unpredictable (e.g. visiting patients with bipolar disorder or schizophrenia). When arriving at the destination, the system would be armed by the worker. The device could consist of or be configured to look like a cell phone or personal digital assistant. Every time period that allows the worker to finish a step of his/her work, the worker would have to enter a code to the device to reset the watchdog. Just before the watchdog expires the device could appear to receive a telephone call or text message, or sound a reminder alarm. Optionally, motion could be a continuous reset of the watchdog (allowing for minimum disturbance of the functions that are being carried out by the worker).

This application makes use of expected workflow. During the visit workflow step completion could be monitored (through a code entered into the device including but not limited to a verbal statement of step completion) and used to reset the watchdog. Each step could have its own watchdog time associated with it which would serve the additional purpose of helping to enforce process and/or workflow. If the watchdog expires, the system alarm would be triggered requesting support. When the worker leaves, a different code could be entered to disable the system. In addition, the system could have a panic button that allows immediate instigation of the alarm response.

A further application is in home healthcare. In the case of people at medical risk there are systems available that are physical pendants that contain one or more push buttons or voice activated signaling systems that will, upon user intervention, alert 911 or (an) emergency service agenc(y/ies) if the patient falls or has another mishap. This invention could improve this application by having multiple watchdog mechanisms that will act even if the user no longer can.

The device in this embodiment is probably worn by the user. The watchdog interval is set to strike a balance between user annoyance and system response time. By having a simple enough reset mechanism to minimize annoyance, the watchdog period can be kept short allowing for faster system response time. Standard reset mechanisms such as a button or code would be available. Voice and speech recognition would allow an easy alternate reset option. Sensing user motion would also allow an easy way of resetting the watchdog. In this case, the user conducting the activities of normal life would keep the watchdog reset most of the time. It is possible that each reset mechanism would be tied to a separate watchdog whose reset interval is related to the level of annoyance the user will tolerate. For example, a reset code is tied to an approximately 12 hour watchdog, voice recognition to a an approximately 1 hour watchdog, and motion associated with an approximately 5 minute watchdog. The watchdog warning could be any signal. For example, the warning could consist of ringing the mobile telephone, sounding an alarm, or initiating a voice announcement.

System initiation and disable would typically be triggered by a switch or code. System initiation would be available to a superuser so the user could not disable the system when (s)he feels it is too annoying. However, to accommodate user lifestyle needs, the system would then support modes that the user could select to match his/her current activities. Each mode could have different watchdog timeout intervals, change the reset mechanisms (e.g. to avoid situations where specific resets are not reasonable or may happen accidentally), and to change watchdog warnings (e.g. audio warnings may not be appropriate during a movie or play). For example, there could be a sleep or nap mode where the system sets the watchdog length to the expected length of the sleep or nap. There could be a visitor/TV/radio mode that ignores verbal/audio resets. There could be a visitor mode where the system is temporarily disabled while there are visitors and it can be reasonably assumed that the visitors will respond to distress. There could be a play/movie mode where the warning is only a vibration.

Such a device could have one or more of a multitude of automatic warning triggers. It could have sensors to monitor a variety of physiological vital signs (e.g. heart rate, blood pressure, breathing, blood oxygenation). Deviation from an acceptable range could trigger an automatic watchdog warning, and lack of response could trigger the watchdog response. Watchdog response could include calling a relative or neighbor or case worker, calling emergency services (e.g. ambulance or 911), initiating a speaker phone call with an external agent (e.g. monitoring service), or even calling the user's telephone to confirm the situation before escalating to another response. The system could be integrated with a reminder/appointment system that could do things like remind the user to take their medicines and looking for confirmation when they have been taken.

The advantages of the present invention include, without limitation, signaling of alarm conditions based on the lack of an event at the sensors within the monitoring system. The ability to automatically operate provides additional protection to users of the system.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

We claim:

1. A method for providing automatic alarm signals comprising:
    a. at least one watchdog timer(s),
    b. at least one initiation mechanism which starts said watchdog timer(s),
    c. at least one reset mechanism to reset said watchdog timer(s),
    d. a watchdog timeout response, comprising at least a wireless communication to an external entity, which is the action taken when any of said watchdog timer(s) expire(s),
    e. a watchdog disable, which disables at least one of said watchdog timer(s), whereby a lack of response on the part of a user results in said watchdog timeout response action occurring and a message being sent of the said alarm signal(s).

2. The method of claim 1, further including a user warning mechanism which acts after any of said watchdog timer(s) have expired and before said watchdog timeout response, whereby said user is warned of said impending watchdog timeout response and is given a predetermined time interval to reset said watchdog timer(s).

3. The method of claim 2, further including an automatic trigger which can immediately start said warning mechanism whereby specific events can cause said method to immediately require user response or initiate said watchdog timeout response.

4. The method of claim 2, wherein said user warning mechanism appears to be any of a multitude of typical smart phone functions including but not limited to a phone call, a text message, or an alarm whereby said user warning mechanism does not stand out as said user warning mechanism to people who are not the user.

5. The method of claim 1, further including a system mode wherein said watchdog timer(s) have different pre-determined intervals based on said system mode, which may change based on, but limited to, any of time, location, workflow stage, or user input whereby pre-determined watchdog timer interval(s) can match the requirements of said system mode.

6. The method of claim 5, wherein said system mode is determined based on environmental inputs whereby the system can exhibit situational awareness and can respond to the environment.

7. The method of claim 1, wherein said watchdog timer(s) are arranged in sequence and may have different pre-determined intervals based on user workflow wherein the reset of one of said watchdog timer(s) terminates it and starts the next of said watchdog timer(s) whereby said watchdog timer timing can naturally flow with said user workflow.

8. The method of claim 1, further including a false reset mechanism that will trigger said watchdog timeout response whereby the user can appear to outsiders to have disabled the system but has actually triggered it.

9. The method of claim 1, further including a location mechanism wherein said location mechanism can be used to trigger any of said initiation mechanism(s), said reset mechanism(s) or said automatic trigger based on pre-determined locations whereby the system can respond automatically to user location.

10. The method of claim 1, further including a control center wherein said control center can control any of said components of said method whereby allowing the control center to enforce specific system settings.

11. A mobile monitoring system comprising:
   a. a wireless communication means which can be used to communicate with one or more predetermined remote entities,
   b. a watchdog timer
   c. an end user device which is used by the user for system interaction
   d. an initiation means which can be used to start the watchdog timer
   e. a reset means which can be used to re-start the watchdog timer
   f. a disable means which can be used to stop the watchdog timer whereby a user or remote entity can manipulate a watchdog timer so that if it naturally expires then an alarm can be sent to a third party alerting them to a problem.

12. The system of claim 11 further comprising a warning means which can alert said user or any of said predetermined remote entities of the impending expiration of said watchdog timer whereby said user can reset or stop the watchdog before the system response is initiated.

13. The system of claim 12 further comprising one or more sensor(s) which can trigger said warning mechanism whereby specific environmental conditions will prepare the system to send the alarm immediately if not countermanded.

14. The system of claim 11 further comprising one or more environment sensor(s) and a system state whereby the system parameters can be set based on information from the current environment.

15. The system of claim 14 further comprising a positioning means whereby any of said initiation, reset or disable means can be affected or the location can be transmitted via said wireless communication means.

16. The system of claim 14 further comprising a system server where some elements of the system reside and are connected using said wireless communication means whereby elements of said system are located elsewhere from the user.

17. The system of claim 14 further comprising a plurality of sequential watchdog timers whereby the system is correlated to a pre-determined workflow, allowing the system to most tightly mirror said pre-determined workflow.

* * * * *